United States Patent

Gellert et al.

[11] Patent Number: 5,942,257
[45] Date of Patent: Aug. 24, 1999

[54] MULTI-LAYER INJECTION MOLDING APPARATUS HAVING THREE POSITION VALVE MEMBER

[75] Inventors: Jobst Ulrich Gellert, Georgetown; Helen Zhuang, Mississauga, both of Canada

[73] Assignee: Mold-Masters Limited, Georgetown

[21] Appl. No.: 09/013,278

[22] Filed: Jan. 26, 1998

[30] Foreign Application Priority Data

Dec. 18, 1997 [CA] Canada ................................. 2225287

[51] Int. Cl.⁶ .................................................. B29C 45/23
[52] U.S. Cl. .......................... 425/130; 425/562; 425/564
[58] Field of Search .................................. 425/562, 563, 425/564, 565, 566, 130

[56] References Cited

U.S. PATENT DOCUMENTS 4,657,496  4/1987  Ozeki et al. ............................. 425/562
4,919,606  4/1990  Gellert ..................................... 425/562

Primary Examiner—Tim Heitbrink
Attorney, Agent, or Firm—Dalesman & Company

[57] ABSTRACT

Valve gated injection molding apparatus having three position valve member actuating mechanism for multilayer molding. A first melt passage extends to the gate through an annular channel in a heated nozzle, while a second melt passage extends around an elongated valve member in a central melt channel. A rack member engaging the rear end of the valve member is driven by a pinion member connected to a front piston in a front cylinder. A rear piston in a shorter rear cylinder aligned with the front cylinder has a stem extending forwardly into the front cylinder. First, air pressure applied behind the rear piston retracts the valve member from a first closed position to a second partially open position wherein melt flows only through the annular channel. Then, air pressure applied behind the front piston retracts the valve member to a third fully open position wherein melt flows simultaneously through both melt channels to provide the three layers. When the cavity is nearly full, air pressure is released behind and applied in front of the front piston to return the valve member to the second position until the cavity is full. Air pressure is then released behind the third piston to advance the valve member to the first closed position in which its front end is seated in the gate for ejection.

4 Claims, 4 Drawing Sheets

MULTI-LAYER INJECTION MOLDING APPARATUS HAVING THREE POSITION VALVE MEMBER

BACKGROUND OF THE INVENTION

This invention relates generally to valve gated injection molding apparatus and more particularly to such apparatus having three position valve member actuating mechanism for multi-layer molding.

Valve gated injection molding apparatus for making multi-layered protective containers for food or preforms or parisons for beverage bottles are well known. Often the inner and outer layers are made of a polyethylene terephthalate (PET) type material with one or more barrier layers made of a material such as ethylene vinyl alcohol copolymer (EVOH) or nylon. For instance, U.S. Pat. No. 4,657,496 to Ozeki et al. which issued Apr. 14, 1987 shows an actuating mechanism having an outer piston reciprocating in an outer cylinder and an inner piston reciprocating in an inner cylinder. The inner piston drives the elongated valve member and the outer piston drives a stem surrounding the elongated valve member and they operate in a controlled injection cycle to sequentially inject first the PET and then the barrier material to mold three layer products. While this is satisfactory for some applications, sequential molding has the disadvantage of a relatively lengthy cycle time.

As seen in U.S. Pat. No. 4,919,606 to Gellert which issued Apr. 24, 1990, rack and pinion valve member actuating mechanism is also known. However, previously it had the disadvantage of only providing open and closed positions, which is not sufficient for multi-layer molding.

SUMMARY OF THE INVENTION

Accordingly, it is an object of the present invention to at least partially overcome the disadvantages of the prior art by providing a valve gated injection molding apparatus having three position rack and pinion valve member actuating mechanism for multi-layer molding.

To this end, in one of its aspects, the invention provides valve gated injection molding apparatus for multi-layer molding having one or more manifolds and one or more heated nozzles mounted in a mold. The heated nozzle has a rear end, a front end, a central melt channel extending to the front end, and one or more annular melt channels extending around the central melt channel to the front end of the nozzle. The heated nozzle extends from the manifold with the central melt channel in alignment with and adjacent to a gate leading to a cavity in the mold. A first melt passage from a first melt source extends through the manifold and one of the melt channels in the heated nozzle to the aligned gate. A second melt passage from a second melt source extends through the manifold and one of the melt channels in the heated nozzle to the aligned gate. An elongated valve member having a rear end and a front end extends through the central melt channel in the heated nozzle. A rack and pinion actuating mechanism reciprocates each elongated valve member between a first closed position, a second partially open position, and a third fully open position. The actuating mechanism includes a rack member slidably received in the manifold to engage the rear end of the elongated valve member having a row of outwardly facing teeth. A pivotally mounted pinion member with an outer end and an inner end has a number of teeth which engage the teeth of the rack member. The actuating mechanism also includes a front cylinder, a rear cylinder adjacent to and aligned with the front cylinder, a front piston seated in the front cylinder and connected to the outer end of the pinion member and a rear piston seated in the rear cylinder. The rear piston has a stem projecting from the rear cylinder into the front cylinder to maintain at least a predetermined minimum distance between the front and rear pistons. First and second fluid lines from a fluid pressure supply are connected to the front cylinder on opposite sides of the piston, and a third fluid line from the fluid pressure supply is connected to the rear cylinder on the rear side of the rear piston. Applying fluid pressure through the first, second and third fluid pressure lines reciprocates the elongated valve member between the first closed position, the second partially open position and the third fully open position according to a continuous injection cycle. Fluid pressure if first released from the first fluid line and fluid pressure is applied from the third fluid line to drive the rear piston to a fully forward position whereby the stem drives the front piston to an intermediate position. This drives the elongated valve member rearwardly from the first closed position to the second partially open position wherein the front end of the elongated valve member is retracted sufficiently to allow melt flow from the first melt source through the outer annular melt channel through the at least one heated nozzle and the gate. After a short period of time, fluid pressure is applied from the second fluid line to drive the front piston to a fully forwardly position. This drives the elongated valve member rearwardly to the third fully open position wherein the front end of the elongated valve member is retracted sufficiently to allow simultaneous flow of melt from the second melt source through the central melt channel and the gate. When the cavity is almost filled, fluid pressure is released from the second fluid line and fluid pressure is applied from the first fluid line to return the front piston to the intermediate position which returns the elongated valve member to the second partially open position until the cavity is filled. Then, fluid pressure is released from the third fluid line to drive the front and rear pistons to fully retracted positions. This drives the elongated valve member to the first closed position wherein the front end of the elongated valve member is seated in the gate to allow for ejection of the molded part.

Further objects and advantages of the invention will appear from the following description taken together with the accompanying drawings.

DETAILED DESCRIPTION OF THE INVENTION

Figure 1:
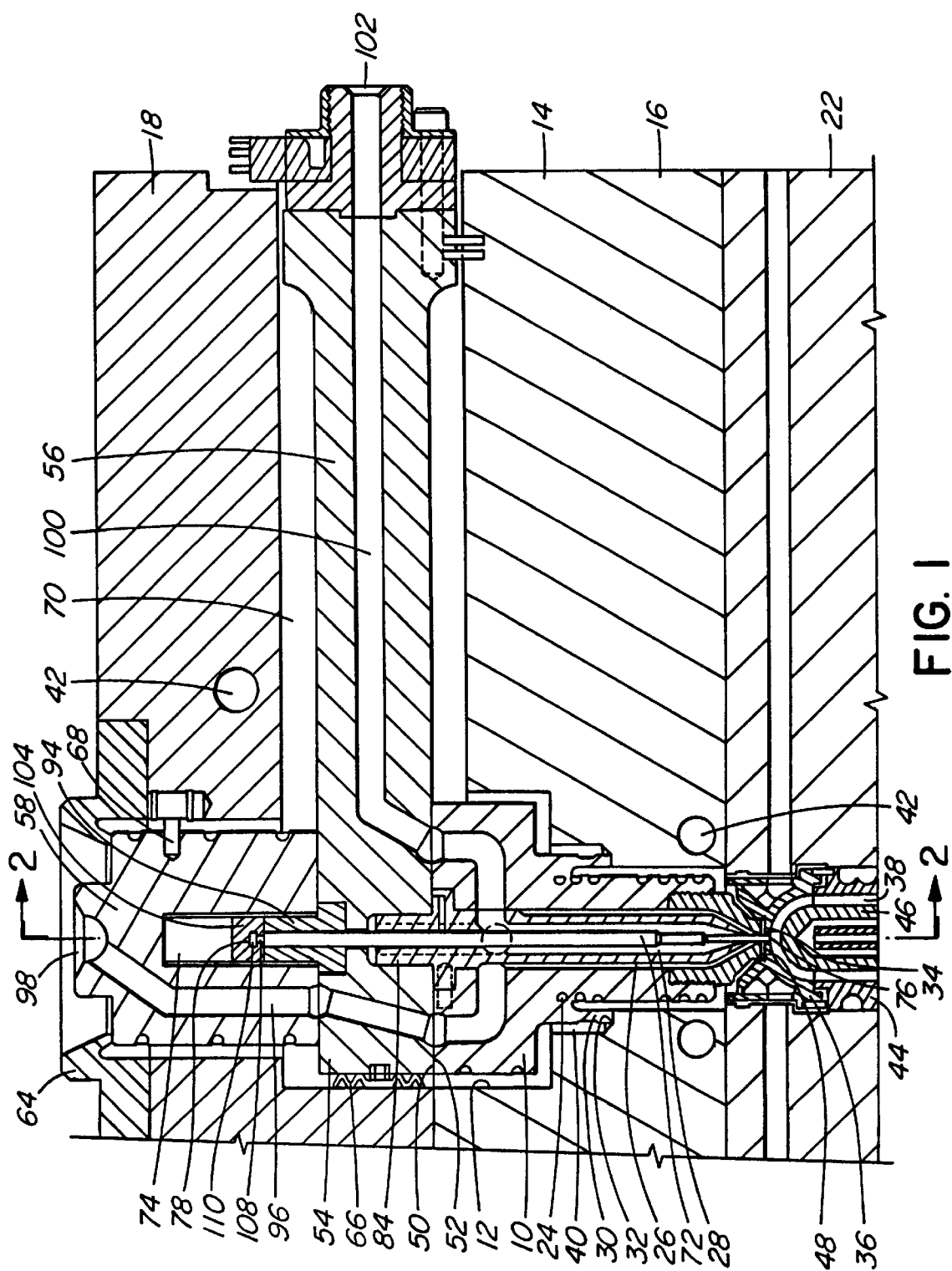
FIG. 1 is a sectional view of a portion of a valve gated injection molding apparatus according to a preferred embodiment of the invention.
Figure 2:
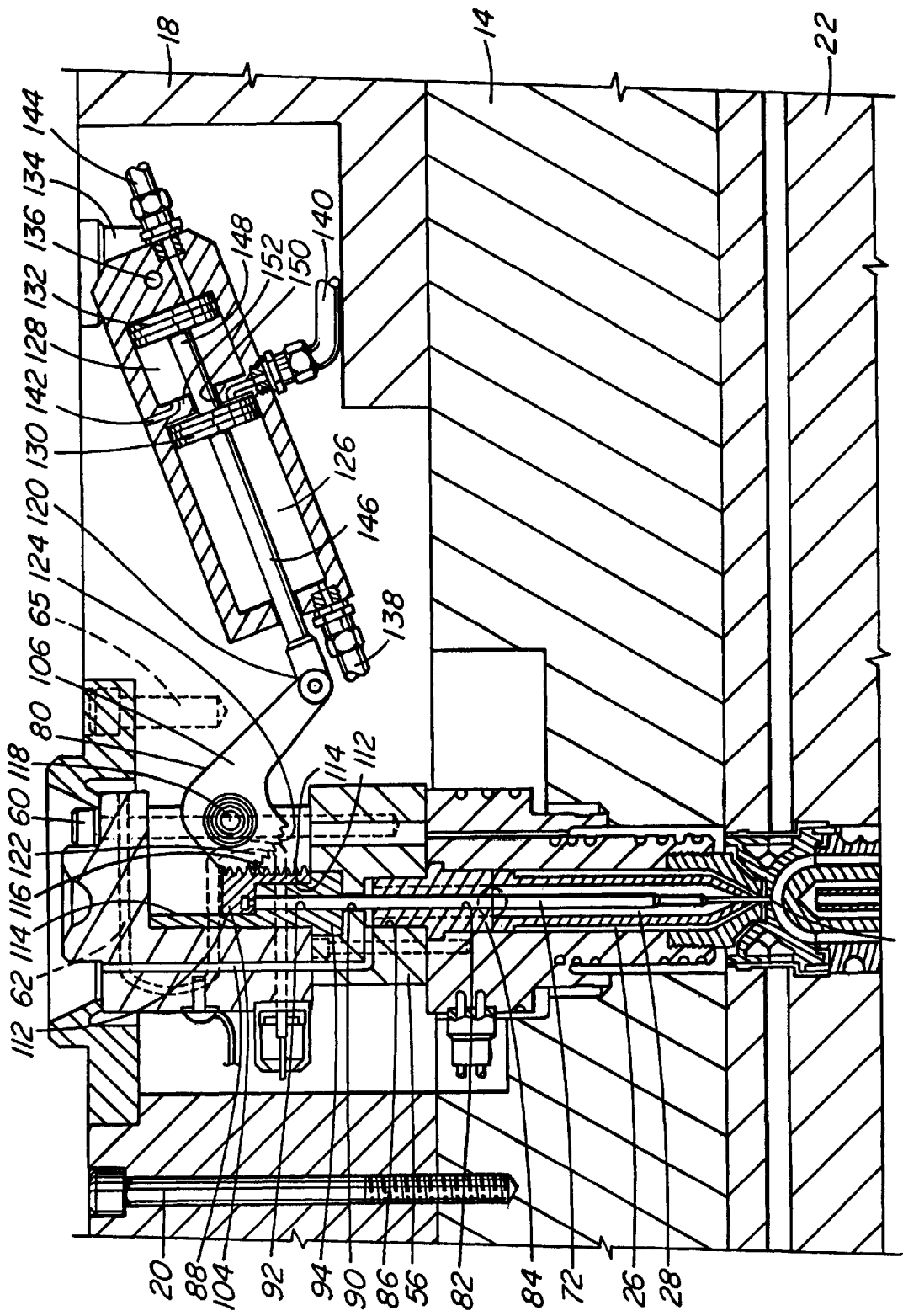
FIG. 2 is a sectional view taken along line 2—2 in FIG. 1 showing the elongated valve member in the first closed position.

Reference is first made to FIGS. 1 and 2 which show a portion of a valve gated single cavity injection molding for molding three layer preforms or other products by a combination of sequential and simultaneous coinjection molding. A heated steel nozzle 10 is seated in an opening 12 in a nozzle retainer plate 14 which forms part of the mold 16. While the mold 16 can have a greater number of plates depending upon the application, in this embodiment only the nozzle retainer plate 14 and a manifold retainer plate 18 which are secured together by bolts 20, as well as a cavity retainer plate 22 are shown for ease of illustration. The heated nozzle 10 has an integral electrical heating element 24 and an annular melt channel 26 extending around a central melt channel 28. The heated nozzle 10 has a collar portion 30 which is received in circular seat 32 extending around the opening 12. This locates the heated nozzle 10 with its central melt channel 28 extending in alignment with a gate 34 extending through a cooled gate insert 36 to a cavity 38. It also provides an insulative air space 40 between the heated nozzle 10 and the surrounding mold 16 which is cooled by pumping cooling water through cooling conduits 42. The cavity 38 for making beverage bottle preforms extends between a cavity insert 44 and a mold core 46 in a conventional manner.

The heated nozzle 10 has a front end 48 and a rear end 50 which abuts against the front face 52 of a heated steel manifold 54. In this single cavity embodiment which is often used as a trial before making a full multi-cavity system, the heated manifold 54 has a front plate portion 56 and a rear cylindrical portion 58 secured together by bolts 60. In other embodiments for single cavity molding, the manifold 54 is all one piece. In other embodiments for multi-cavity molding of two materials having different temperature characteristics there are two manifolds, one extending in front of the other. The manifold 54 is heated by an integral electrical heating element 62. The manifold 54 is secured in place by a mold locating ring 64 attached to the manifold retainer plate 18 by screws 65. The heated manifold 54 is accurately located by a locating pin 68 and has an insulative air space 70 between it and the adjacent cooled mold 16.

An elongated steel valve member 72 extends from the central melt channel 28 rearwardly into a slot 74 in the rear portion 58 of the manifold 54. The elongated valve member 72 has a front end 76 which fits in the gate 34 and a rear end 78 which is engaged by rack and pinion actuating mechanism 80 described below. The elongated valve member 72 fits through a central bore 82 in a valve bushing 84 which extends from the heated nozzle 10 rearwardly into a matching seat 86 in the front plate portion 56 of the manifold 54. A seepage hole 88 extends from the seat 86 to vent melt or corrosive gases which can be generated by friction from the elongated valve member 72 reciprocating in the bore 82. The elongated valve member 72 also extends rearwardly through an aligned bore 90 in the front plate portion 56 of the manifold 54 and an aligned central bore 92 in another bushing 94 securely seated in the manifold 54.

In this embodiment, a first melt passage 96 receives melt through a first inlet 98 and extends through the heated manifold 54 and the heated nozzle 10 as shown to join the annular melt channel 26 in front of the valve bushing 84. A second melt passage 100 receives melt through a second inlet 102 and extends through the front plate portion 56 of the heated manifold 54 and the heated nozzle 10 as shown to join the central melt channel 28 in front of the valve bushing 84 and extend around the elongated valve member 72 to the gate 34. An insulative and resilient spacer 66 takes up the machine pressure from second inlet 102. Thus, as described in more detail below, the melt from the first inlet 98 flows to the gate 34 through the annular melt channel 26 around the melt from the second inlet 102 flowing through the central melt channel 28.

Referring also to FIG. 2, the valve member actuating mechanism 80 includes a rack member 104 which fits in the slot 74 in the rear portion 58 of the manifold 54 and a pinion member 106 which extends into the slot 74. The rack member 104 has a T-shaped gap 108 which engages the head 110 of the elongated valve member 72. The rack member 104 also has two inwardly facing flat sliding surfaces 112 which abut against two outwardly facing sliding surfaces 114 on the valve member bushing 94 and a row of outwardly facing teeth 116. The pinion member 106 is pivotally mounted on a pin 118 and has an outer end 120 extending out of the slot 74 and an inner end 122 with teeth 124 which engage the teeth 116 on the rack member 104.

The valve member actuating mechanism 80 also includes a front cylinder 126, a rear cylinder 128 aligned with the front cylinder 126, a front piston 130 seated in the front cylinder 126 and a rear piston 132 seated in the rear cylinder 128. As can be seen, the aligned cylinders 126, 128 are attached to a fixed mounting bracket 134 by a pin 136 which allows them to pivot during operation. The front cylinder 126 has first and second air lines 138, 140 connected on opposite sides of the front piston 130. The rear cylinder 128 has a vent hole 142 extending on the front side of the rear piston 132 and a third air line 144 connected on the rear side of the rear piston 132. While a pneumatic actuating mechanism 80 is shown, in other embodiments a hydraulic actuating mechanism can be used. The front piston 130 is connected by a connecting rod 146 to the outer end 120 of the pinion member 106. The rear cylinder 128 is shorter in length than the front cylinder 126, and the rear piston 132 has a stem 148 which projects through a hole 150 in the wall 152 into the front cylinder 126 to maintain at least a predetermined minimum distance between the front and rear pistons 130, 132.

In use, the injection molding system is assembled as shown in FIGS. 1 and 2 and operates to form three layer preforms or other products with one barrier layer of a material such as EVOH or nylon between two layers of a PET type material as follows. Electrical power is applied to the heating element 24 in the nozzle 10 and the heating element 62 in the manifold 54 to heat them to a suitable operating temperature. Water is supplied to the cooling conduits 42 and the mold core 46 to cool the mold 16, the gate insert 36 and the cavity 38. A first injection cylinder (not shown) mounted at the first inlet 98 injects pressurized melt such as a polyethylene terephthalate (PET) type material into the first melt passage 96 and a second injection cylinder (not shown) mounted at the second inlet 102 injects another pressurized melt which is a suitable barrier material such as ethylene vinyl alcohol copolymer (EVOH) or special nylon into the second melt passage 100 according to a predetermined injection cycle. As mentioned above, when molding materials such as these having different melting points, two manifold mounted one in front of the other heated to different temperatures are used. Controlled pneumatic pressure from a pressure supply is also applied to the air lines 138, 140, 144 to reciprocate the elongated valve member 72 according to the injection cycle.

Figure 3:
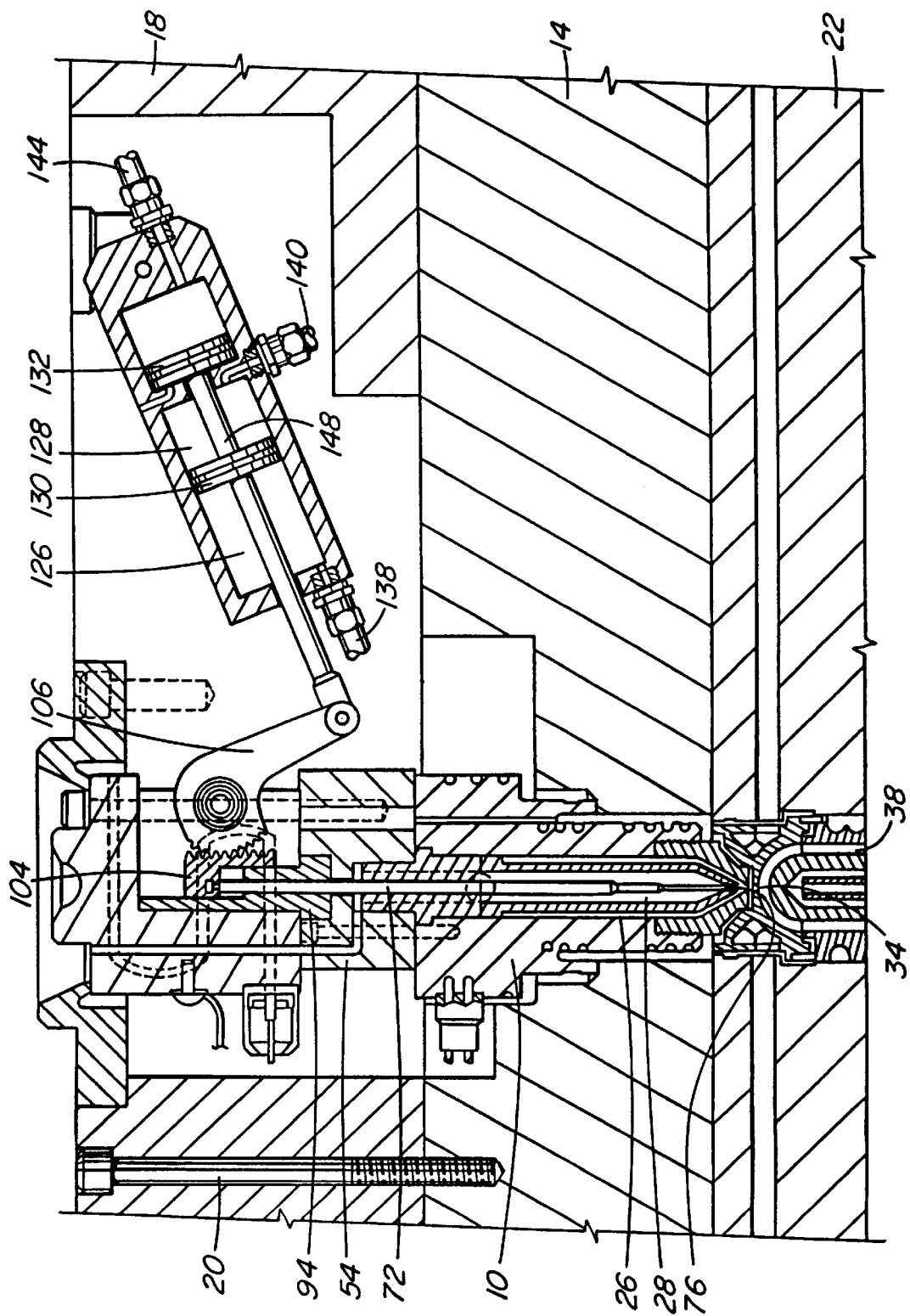
FIG. 3 is a similar view showing the elongated valve member in the second partially open position.
Figure 4:
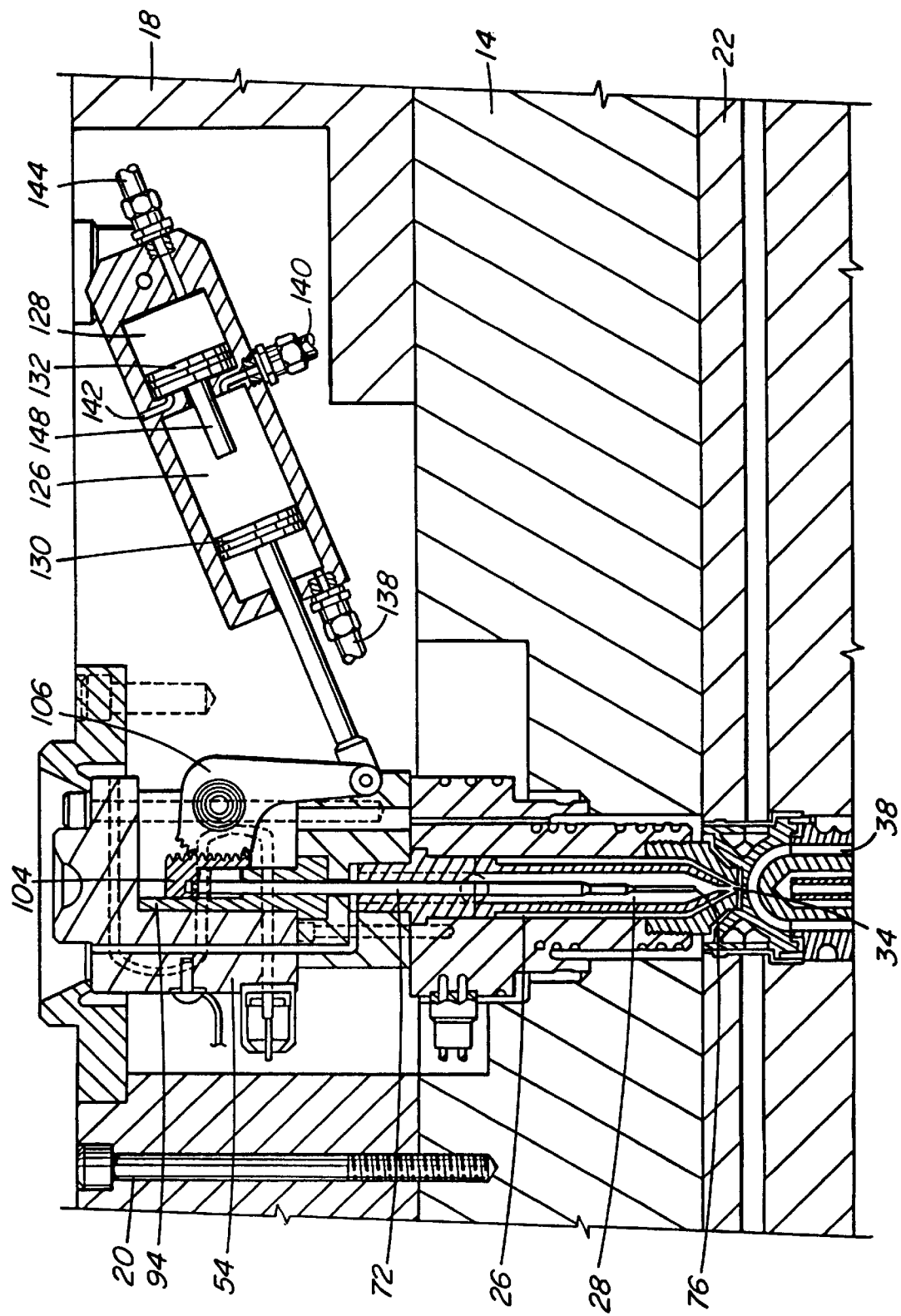
FIG. 4 is a similar view showing the elongated valve member in the third fully open position.

First, air pressure is released from the first air line 138 and air pressure is applied through the third air line 144 which drives the rear piston 132 to a fully forward position. The stem 148 projecting into the front cylinder 126 drives the front piston 130 to an intermediate position which, in turn, drives the elongated valve member 72 rearwardly from a first closed position shown in FIG. 2 to a second partially open position shown in FIG. 3. In this second position, the front end 76 of the elongated valve member 72 is retracted sufficiently to allow PET from the first melt passage 96 to flow through the annular melt channel 26 in the heated nozzle 10. After a small quantity of PET has been injected into the cavity 38, air pressure is applied through the second air line 140 to drive the front piston 130 to a fully forward position. This drives the elongated valve member 72 rearwardly to a third fully open position shown in FIG. 4 in which the front end 76 of the elongated valve member 72 is retracted sufficiently to allow the barrier material from the second melt passage 100 to flow through the central melt channel 28 and the gate 34 simultaneously with the PET from the first melt passage 96 flowing through the annular melt channel 26. The barrier material flowing simultaneously with the PET splits the PET flow in two and provides a central layer of the barrier material between two outer layers of PET.

When the cavity 38 is almost filled, air pressure is released from the second air line 140 and air pressure is applied from the first air line 138 to return the front piston 130 to the intermediate position which returns the elongated valve member 72 to the second partially open position. This closes off flow of the barrier material through the central melt channel 28 and allows only PET from the first melt passage 96 to flow through the annular melt channel 26 until the cavity 38 is filled. After a short packing period, air pressure is released from the third air line 144 to drive both pistons 130, 132 to their fully retracted positions. This, in turn, drives the elongated valve member 72 to the first closed position shown in FIG. 2 with its front end 76 seated in the gate 34 to allow the mold to open for ejection. After ejection, the mold 16 is closed and the cycle is repeated continuously every 15 to 30 seconds with a frequency depending upon the wall thickness and number and size of the cavities 38 and the exact materials being molded.

While the description the valve gated injection molding apparatus having three position rack and pinion valve member actuating mechanism has been given with respect to a preferred embodiment, it will be evident that other various modifications are possible without departing from the scope of the invention as understood by those skilled in the art and as defined in the following claims. For instance, the description of the three position actuating mechanism has been given for three layer molding with a single manifold, but it can also be used with apparatus having separate front and rear manifolds. It can also be used for five layer molding by having two PET melt passages with a valve in one of them as shown in the applicants' Canadian Patent Application Ser. No. 2219257 filed Oct. 23, 1997, entitled "Sprue Gated Five Layer Injection Molding Apparatus". Furthermore, this three position actuating mechanism can be used in a multicavity application by providing a separate actuating mechanism for each heated nozzle 10.

The embodiments of the invention in which an exclusive property or privilege is claimed is defined as follows:

1. In a valve gated injection molding apparatus for multilayer molding having at least one manifold and at least one heated nozzle mounted in a mold, the at least one heated nozzle having a rear end, a front end, a central melt channel extending to the front end, and at least one annular melt channel extending around the central melt channel to the front end of the nozzle, the at least one heated nozzle extending from the at least one manifold with the central melt channel in alignment with and adjacent to a gate leading to a cavity in the mold, a first melt passage from a first melt source extending through the at least one manifold and at least one of the melt channels in the at least one heated nozzle to the aligned gate, a second melt passage from a second melt source extending through the at least one manifold and at least one of the melt channels in the at least one heated nozzle to the aligned gate, an elongated valve member having a rear end and a front end extending through the central melt channel in the at least one heated nozzle, the improvement further comprising:

arack and pinion actuating mechanism to reciprocate each elongated valve member between a first closed position, a second partially open position, and a third fully open position, the actuating mechanism comprising:
(a) a rack member slidably received in the at least one manifold to engage the rear end of the elongated valve member, the rack member having a row of outwardly facing teeth,
(b) a pivotally mounted pinion member with an outer end and an inner end having a plurality of teeth which engage the teeth of the rack member, and
(c) a front cylinder, a rear cylinder adjacent to and aligned with the front cylinder, a front piston seated in the front cylinder and connected to the outer end of the pinion member, a rear piston seated in the rear cylinder, the rear piston having a stem projecting from the rear cylinder into the front cylinder to maintain at least a predetermined minimum distance between the front and rear pistons, first and second fluid lines from fluid pressure means connected to the front cylinder on opposite sides of the front piston, and a third fluid line from fluid pressure means connected to the rear cylinder on the rear side of the rear piston, whereby applying fluid pressure through the first, second and third fluid pressure lines reciprocates the elongated valve member between the first closed position, the second partially open position and the third fully open position according to a continuous injection cycle, wherein fluid pressure if first released from the first fluid line and fluid pressure is applied from the third fluid line to drive the rear piston to a fully forward position whereby the stem drives the front piston to an intermediate position which drives the elongated valve member rearwardly from the first closed position to the second partially open position wherein the front end of the elongated valve member is retracted sufficiently to allow melt flow from the first melt source through an outer one of the at least one annular melt channel through the at least one heated nozzle and the gate, after a short predetermined period of time fluid pressure is applied from the second fluid line to drive the front piston to a fully forwardly position which drives the elongated valve member rearwardly to the third fully open position wherein the front end of the elongated valve member is retracted sufficiently to allow simultaneous flow of melt from the second melt source through the central melt channel and the gate, when the cavity is almost filled fluid pressure is released from the second fluid line and fluid pressure is applied from the first fluid line to return the front piston to the intermediate position which returns the elongated valve member to the second partially open position until the cavity is filled, and then fluid pressure is released from the third fluid line to drive the front and rear pistons to fully retracted positions which drives the elongated valve member to the first closed position wherein the front end of the elongated valve member is seated in the gate to allow for ejection of the molded part.

2. Injection molding apparatus as claimed in claim 1 wherein the at least one heated nozzle has one annular melt channel extending around the central melt channel, the first melt passage from the first melt source extends through the annular channel, the second melt passage from the second melt source extends through the central melt channel, melt from the first melt source flows through the annular melt channel when the elongated valve member is in the second partially open position, and melt from the second melt source simultaneously flows through the central melt channel when the elongated valve member is in the third fully open position.

3. Injection molding apparatus as claimed in claim 2 comprising only one manifold and only one heated nozzle extending from the manifold.

4. Injection molding apparatus as claimed in claim 1 having a valve member bushing seated in the at least one nozzle, the valve member bushing having a rearwardly extending portion projecting into the at least one manifold, a valve member bore extending therethrough in alignment with the central melt channel through the at least one heated nozzle to receive the elongated valve member therethrough and at least one outwardly facing surface, wherein the rack member has at least one inwardly facing surface slidably abutting against the at least one outwardly facing surface of the valve member bushing.

* * * * *